(12) United States Patent
Muqattash et al.

(10) Patent No.: US 8,275,390 B1
(45) Date of Patent: Sep. 25, 2012

(54) SYSTEM AND METHOD FOR DETECTING ADJACENT CHANNEL DEVICES OR INTERFERENCE

(75) Inventors: Alaa Muqattash, San Diego, CA (US); Abu Amanullah, San Diego, CA (US)

(73) Assignee: Olympus Corporation, Hachioji-Shi, Tokyo (JP)

( * ) Notice: Subject to any disclaimer, the term of this patent is extended or adjusted under 35 U.S.C. 154(b) by 621 days.

(21) Appl. No.: 12/415,868

(22) Filed: Mar. 31, 2009

Related U.S. Application Data

(60) Provisional application No. 61/041,145, filed on Mar. 31, 2008.

(51) Int. Cl.
*H04W 74/00* (2009.01)
(52) U.S. Cl. .................. 455/455; 455/404.2; 455/414.1; 455/414.2; 455/414.3; 455/414.4
(58) Field of Classification Search ............... 455/404.2, 455/414.1–414.4, 455
See application file for complete search history.

(56) References Cited

U.S. PATENT DOCUMENTS

| | | | |
|---|---|---|---|
| 2007/0026866 A1* | 2/2007 | Krishnamurthi et al. | 455/440 |
| 2007/0054682 A1* | 3/2007 | Fanning et al. | 455/509 |
| 2007/0226351 A1* | 9/2007 | Fischer et al. | 709/227 |
| 2007/0230423 A1* | 10/2007 | Yoshida et al. | 370/338 |
| 2008/0082498 A1* | 4/2008 | Dong et al. | 707/3 |
| 2009/0016313 A1* | 1/2009 | Wu | 370/345 |
| 2009/0130977 A1* | 5/2009 | Grushkevich et al. | 455/41.2 |

* cited by examiner

*Primary Examiner* — Jinsong Hu
*Assistant Examiner* — Michael Nguyen
(74) *Attorney, Agent, or Firm* — Sheppard Mullin Richter & Hampton LLP

(57) ABSTRACT

The present invention provides systems and methods are provided to allow a network device to simultaneously monitor multiple adjacent wireless physical layer channels. If network communications are discovered on an adjacent channel, the network device may move to this adjacent channel. Accordingly, the network device is able to discover other devices or services existing on the adjacent channel, and is able to avoid interference caused by adjacent channels coexisting on the same frequency bands. After moving to the adjacent channel, a standard MAC protocol is able to regulate channel excess amongst all the network devices coexisting on the new channel.

14 Claims, 8 Drawing Sheets

SYSTEM AND METHOD FOR DETECTING ADJACENT CHANNEL DEVICES OR INTERFERENCE

CROSS-REFERENCE TO RELATED APPLICATIONS

This application claims the benefit of U.S. Provisional Application No. 61/041,145 filed Mar. 31, 2008.

TECHNICAL FIELD

The present invention relates generally to communication networks, and more particularly, some embodiments relate to detection of wireless communications occurring on adjacent channels.

DESCRIPTION OF THE RELATED ART

Some ultra wideband (UWB) personal area networks (PANS) utilize Multiband Orthogonal Frequency Division Modulation (MB-OFDM) schemes to transmit information. In such schemes, a wide spectrum is divided into multiple bands, which are in turn divided into multiple band groups. For example, a standard UWB spectrum utilizing the unlicensed 3.1-10.6 GHz frequency band is divided into 14 bands, each having a bandwidth of 528 MHz. In this standard, the first 12 bands are grouped into four band groups, each consisting of three bands. The remaining two bands are grouped into a fifth band group. A sixth band group is defined using three bands spanning the third and fourth band group.

In such a scheme, data transmission occurs over physical layer (PHY) channels comprising time frequency coded (TFC) channels. These channels may be broadly divided into two types, (1) fixed frequency interleave (FFI) channels where information is transmitted by interleaving across tones of a single 528 MHz band; and (2) time frequency interleave (TFI) channels where information is transmitted by interleaving across tones of up to all three bands in a band group. For these band groups, multiple time frequency codes are typically used such that multiple channels may coexist within the same band group. Accordingly, when multiple networks coexist using the same band group, the networks will often interfere with each other.

Typically in such PANs, a media access control (MAC) layer protocol provides the capability for many devices to synchronize communications on a single PHY channel. However, the MAC does not coordinate communication between devices operating on different channels. Accordingly, the MAC does not prevent interference between different groups of network devices communicating using different channels. Furthermore, this division of devices into multiple channel groups prevents service discovery and multi-node network applications.

BRIEF SUMMARY OF EMBODIMENTS OF THE INVENTION

According to various embodiments of the invention, systems and methods are provided to allow a network device to simultaneously monitor multiple adjacent wireless physical layer channels. If network communications are discovered on an adjacent channel, the network device may move to this adjacent channel. Accordingly, the network device is able to discover other devices or services existing on the adjacent channel, and is able to avoid interference caused by adjacent channels coexisting on the same frequency bands. After moving to the adjacent channel, a standard MAC protocol is able to regulate channel excess amongst all the network devices coexisting on the new channel.

According to an embodiment of the invention, a method for network communication, comprises wirelessly communicating with a network device using a first channel and simultaneously scanning a range of further channels for wireless signals; communicating with the network device using a second channel according to an access protocol signal transmitted on the second channel if a wireless signal is detected on the second channel of the range of further channels.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

Figure 1:
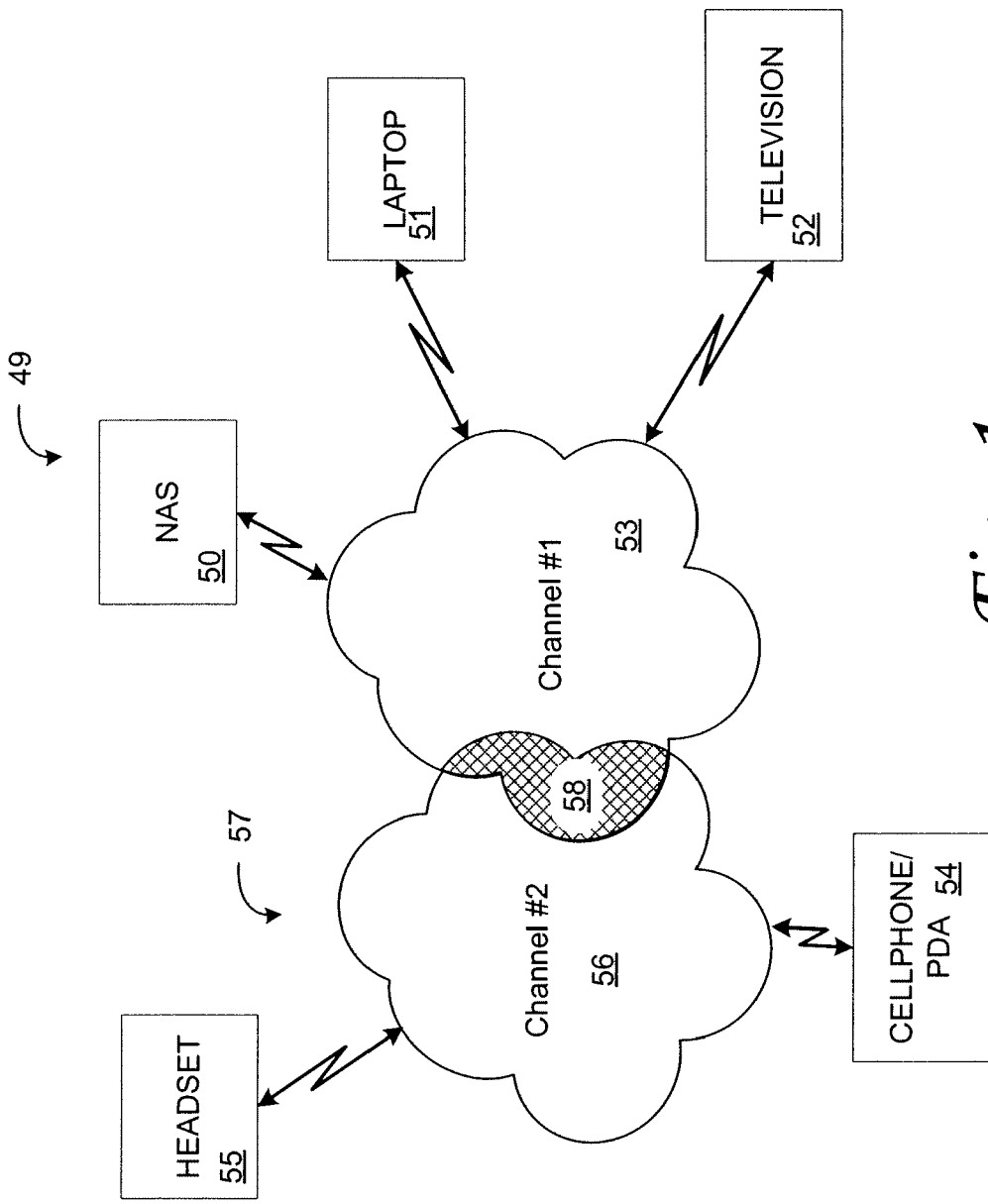
FIG. 1 illustrates an example environment where various embodiments of the invention may be deployed.

Before describing the invention in detail, it is useful to describe an example environment with which the invention can be implemented. One such example is that of ad hoc wireless personal area networks (PANs) piconets. FIG. 1 illustrates such an example environment. In this environment, a plurality of network devices may form an ad hoc wireless network 49 using a first PHY channel 53. For example, a laptop computer 51 may form a piconet network with a network area storage device (NAS) 50 and a television 52 such that media stored on the NAS 50 may be displayed on television 52. For example, wireless network 49 may comprise a network utilizing an ultra wideband standard, where PHY channel 53 comprises a time frequency interleave (TFI) channel utilizing frequency interleaving across multiple bands of a first band group. A second wireless network 57 may be introduced into this environment. For example, a user speaking on a PDA with cell phone capabilities 54 using a wireless headset 55 may enter the vicinity of wireless network 49. The second wireless network 57 may be communicating over a second PHY channel 56. PHY channel 56 may a second TFI channel also utilizing frequency interleaving over the same bands of the first band group.

Device access and synchronization in each of these networks may be regulated by a MAC protocol. However, this MAC protocol may be incapable of regulating communications occurring on separate channels. Accordingly, communications over network 57 and 49 may interfere 58 with each other. Furthermore, devices in network 57 may be incapable of discovering devices in the network 49. For example, PDA 54 may be unable to discover NAS 50 because the MAC protocol is limited to harmonizing communications between devices operating on the same channel.

From time-to-time, the present invention is described herein in terms of this example environment. Description in terms of this environment is provided to allow the various features and embodiments of the invention to be portrayed in the context of an exemplary application. After reading this description, it will become apparent to one of ordinary skill in the art how the invention can be implemented in different and alternative environments.

Figure 2:
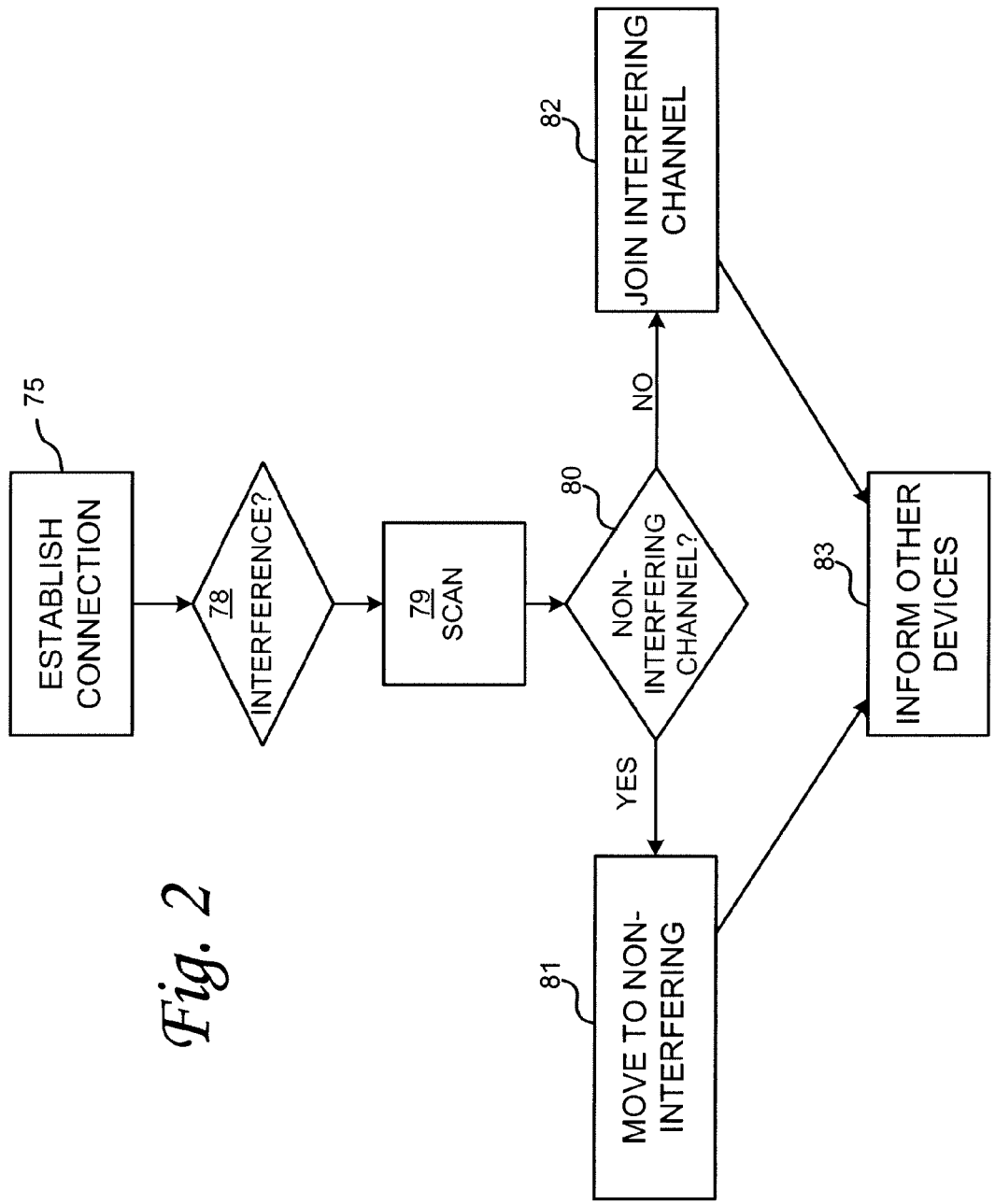
FIG. 2 illustrates a method of avoiding interference caused by communications over nearby channels according to an embodiment of the invention.

FIG. 2 illustrates a method of avoiding interference caused by communications over nearby channels according to an embodiment of the invention. In this embodiment, a network device is equipped with the ability to communicate over two channels simultaneously. Accordingly, the network device is able to transfer data with other network devices over the first channel while monitoring other channels for interference or other networks. Initially, the network device establishes a connection 75 with a further network device. During network communications, if the network device detects interference 78 it begins scanning 79 while simultaneously maintaining the established connection 75. For example, such scanning 79 may comprise sequentially monitoring the remaining channels allocated to the band group on which the network device is communicating.

If the scanning detects communications occurring on a nearby channel, then the network device may determine that these communications are causing interference and may take steps to avoid this interference. For example, if there is a non-interfering channel 80 available, then the network device may move to the non-interfering channel 81. This might occur if the network device was communicating over a FFI link using a first band and the interfering communications comprise a two band TFI link using the first band and a second band, where the third band of the band group is available for a new FFI link. If there is no non-interfering channel, for example if the network device and interfering devices were communicating over two TFI channels of the same band group, then the network device may join the interfering channel 82 and inform the further network devices with which it was communicating 83 to also join the interfering channel. By joining the interfering channel 82, the networks are merged and the MAC protocol is able to regulate network communications to avoid further interference.

Figure 3:
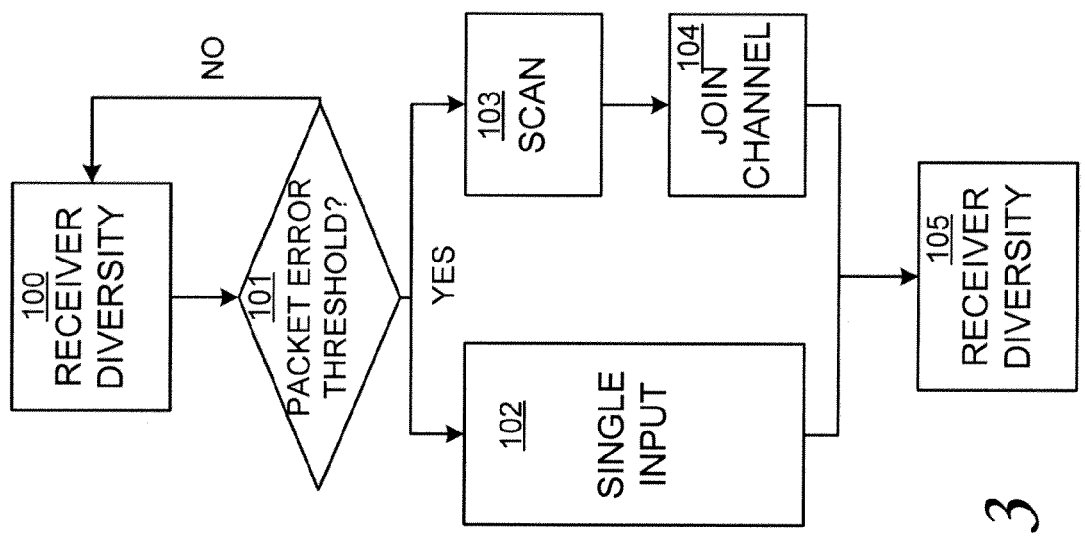
FIG. 3 illustrates a dual-mode method of network operation according to an embodiment of the invention.

FIG. 3 illustrates a dual-mode method of network operation according to an embodiment of the invention. In some embodiments, network devices may have more than one receiving module and may therefore have the ability to implement receiver diversity in addition to, or alternatively to, monitoring nearby channels. In the illustrated embodiment, while network communications are maintained below a predetermined packet error threshold 101, the network device operates in a receiver diversity mode. If network communications exceed the predetermined packet error threshold, then the network device continues communicating with its first antenna under a single input mode 102, thus maintaining the network connection. The network device's second antenna is used to scan 103 nearby channels for the source of interference. For example, scanning 103 may comprise the sequential scanning described with respect to FIG. 2. If the network device detects communications on an adjacent channel, then the network device joins the channel 104 and alerts other network devices on the network to also join the channel. After joining the channel 104 the network device allows channel usage amongst all devices on the new channel to be synchronized under the MAC protocol, thereby eliminating the source of the interference. After joining the new channel, the network device is able to reclaim the use of the second antenna and resume communicating in receiver diversity mode.

Figure 4:
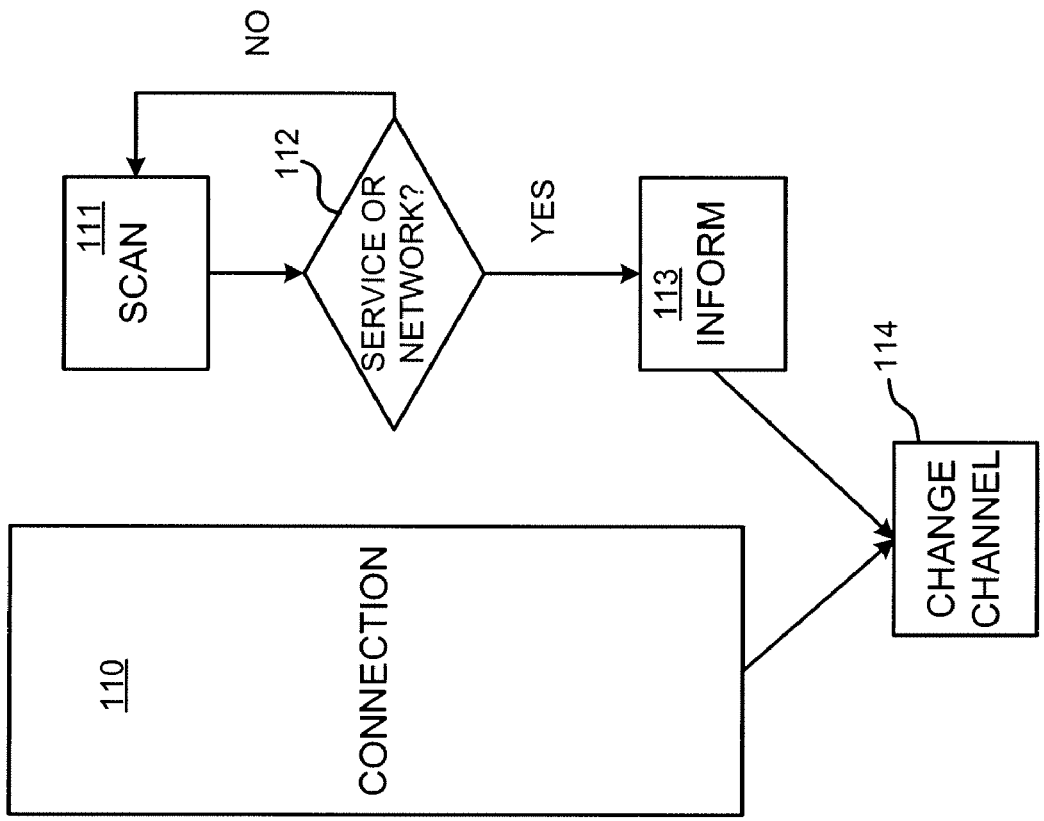
FIG. 4 illustrates a method of service or device detection according to an embodiment of the invention.

FIG. 4 illustrates a method of service or device detection according to an embodiment of the invention. In some embodiments, a network device maintains a network connection over a first PHY channel while simultaneously searching over other channels for network services or devices. In the illustrated embodiment, a first receiver module establishes a network connection over a first PHY channel 110. While network communications occurring over this first PHY channel, a second receiver module begins scanning 111 other available PHY channels for the presence of other network communications 112. For example, the second receiving module might discover the presence of an advertised printing service on a second PHY channel. In some embodiments, the network device may automatically switch to the second PHY channel. For example, the second PHY channel may be a TFC PHY channel that is likely to, or is interfering with the communications over the first PHY channel. In other embodiments, the network device may inform 113 the user of the detected signals. For example, the network device may be a laptop computer and the detected signal may be an advertised print service; after detecting this print service, the laptop may inform the laptop user of this availability. If the network device is configured to automatically change channels, or the user decides to change channels, the network device informs its peer network devices of the impending channel change and begins communicating on the second PHY channel 114.

Figure 5:
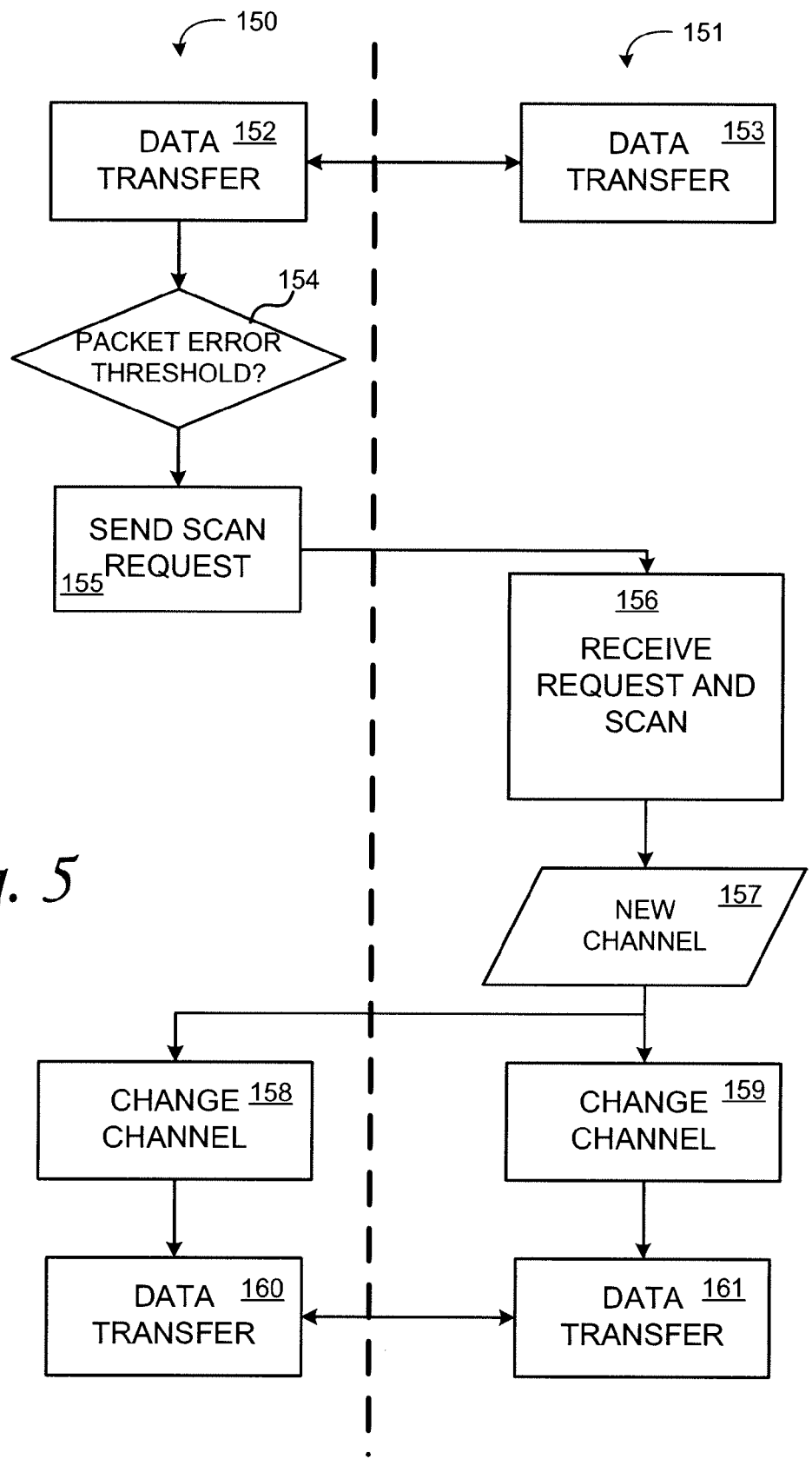
FIG. 5 illustrates a method of detecting interference according to an embodiment of the invention.

FIG. 5 illustrates a method of detecting interference according to an embodiment of the invention. In some embodiments, some network devices may not be equipped with the ability to receive signals on multiple channels simultaneously. In these embodiments, systems and methods can be provided to allow the network devices without such abilities to utilize the services of network devices with such abilities. In the illustrated embodiment, two network devices 150 and 151 are transferring data with each other 152 and 153 over a first PHY channel. In this embodiment, network device 150 is not equipped with the ability to simultaneously scan other PHY channels. If network device 150 perceives a sufficient amount of interference, for example if the packet error rate exceeds a predetermined threshold 154, then the device sends a request for a channel scan 155 to other network devices. A network device that has the ability to simultaneously monitor multiple channels, such as network device 151, receives the scan request and begins scanning neighboring channels for external network communications. Accordingly, even if network device 151 is not able to perceive the existence of the interference, its ability to monitor two channels simultaneously may be used by those devices that can perceive the interference. If a network device 151 discovers another network operating on an interfering PHY channel 157, the network device 151 may inform other network devices, such as network device 150, of the existence of another network. In response, a network device 150 and 151 may change channels 158 and 159, respectively, and resume data transfer 160 and 161, while allowing channel sharing to be regulated amongst all the network devices on new channel 157 by a pre-existing MAC protocol.

Figure 6:
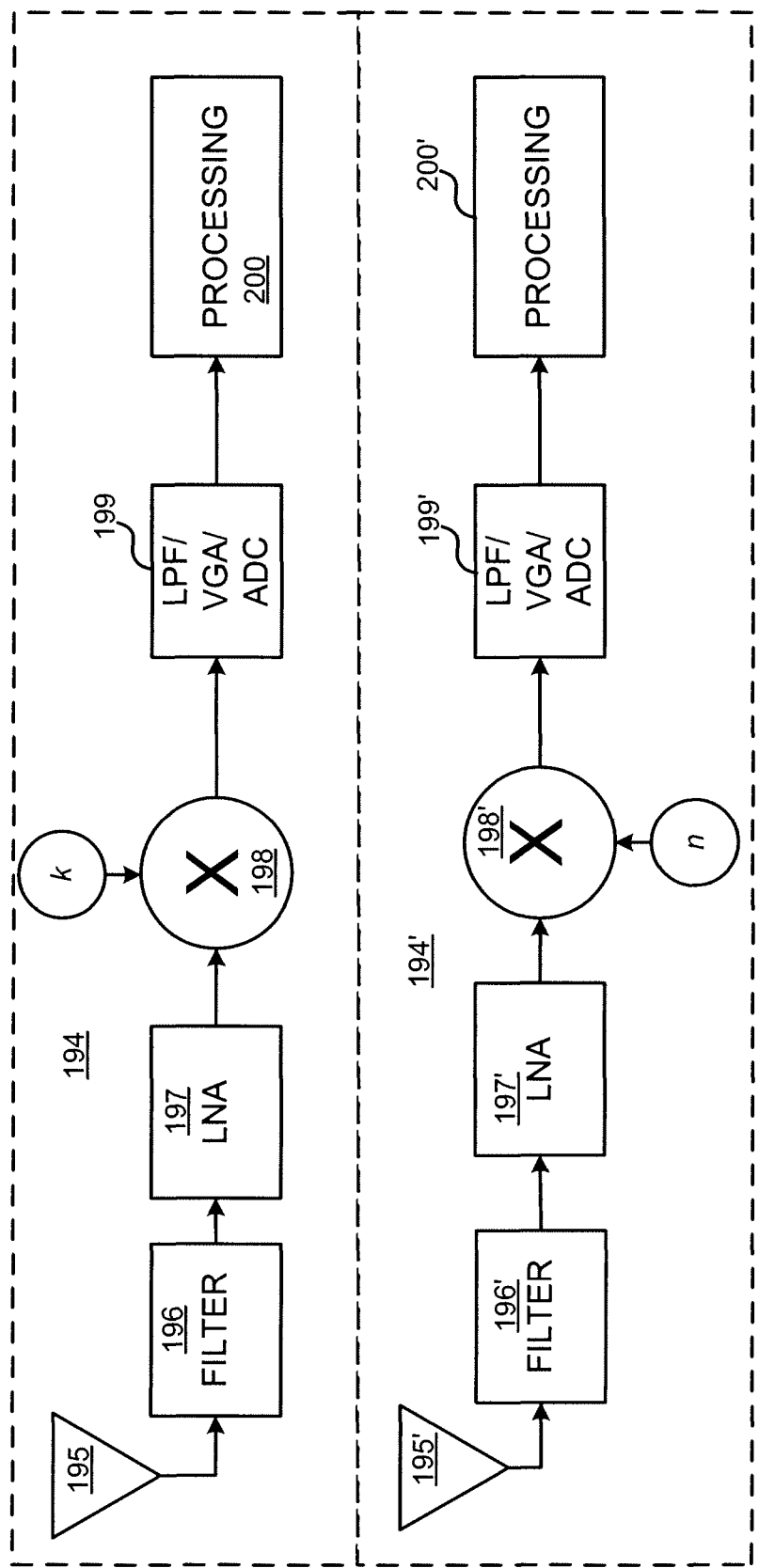
FIG. 6 illustrates a receiving system of a network device having two receiver modules according to an embodiment of the invention.

FIG. 6 illustrates a receiving system of a network device having two receiver modules according to an embodiment of the invention. A first receiving module 194 comprises a receiving antenna 195 coupled to a filter 196, such as a pre-selector. For example, in a UWB network environment, the network device may be configured to operate on a first band group, and the filter 196 and configured to pass only frequencies of that first band group. In some embodiments, particularly where network communications occurring using low-power signals, the filtered signal may be provided to a low noise amplifier 197. After the low noise amplifier configures the signal for further processing, a synchronization module 198 synchronizes the signal to a first channel k. For example, such synchronization may comprise performing automatic gain control (AGC) followed by symbol and frame synchronization. If the network device is communicating over a TFC channel, then symbol synchronization will normally comprise correlating the signal to the base time domain sequence for the given TFC channel. After synchronization, the time and symbol synchronized signal is provided to signal processing module 199. For example, in a UWB network such a signal processing module may comprise a low pass filter, a variable gain amplifier, and an analog to digital converter. The signal processing module 199 provides the processed signal to baseband processor 204 for signal demodulation and decoding.

In the illustrated embodiment, the network device further comprises a second receiving module 194'. Elements illustrated with apostrophes perform substantially the same function as described with respect to receiving module 194. Having two receiving modules allows a network device to synchronize to a second channel n, using synchronization module 198'. Accordingly, by processing two received signals, the network device may monitor neighboring channels for interference or other network devices, as described herein. Furthermore, in this embodiment the ability to receive the two signals using two different antennae allows a network device to implement receiver diversity on a single channel. For example, in examples where signal attenuation is not caused by interference from neighboring channels, the network device may implement receiver diversity to improve the performance on the current PHY channel.

Figure 7:
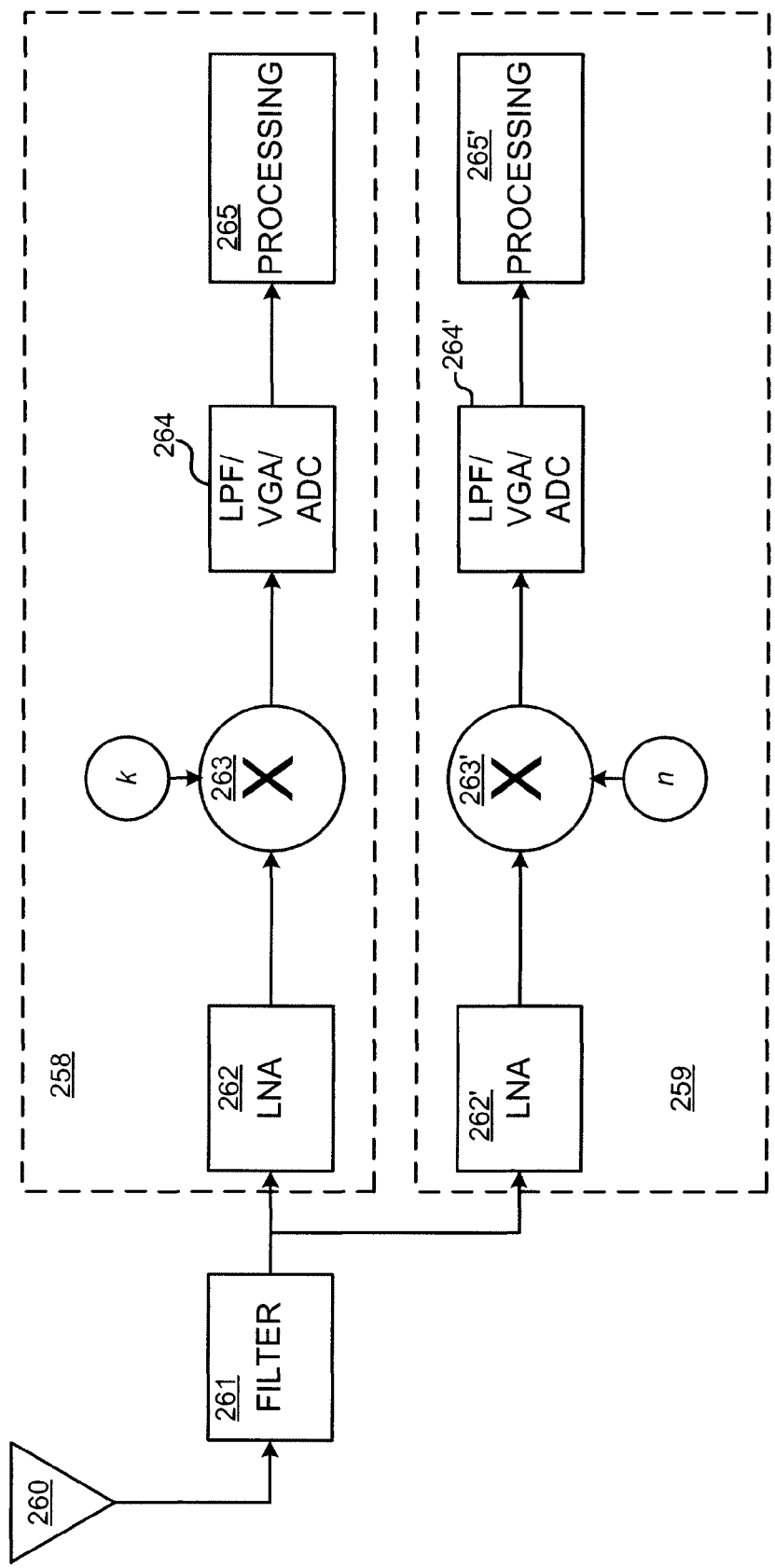
FIG. 7 illustrates the receiving system on a network device utilizing one antenna and two receiving modules, according to an embodiment of the invention.

FIG. 7 illustrates the receiving system on a network device utilizing one antenna and two receiving modules, according to an embodiment of the invention. In some embodiments, network devices may be able to process received signals from one antenna and parallel, thus allowing them to simultaneously monitor different channels for communications. In the illustrated embodiment, an antenna 260 provides received signals to a filter 261. Filter 261, for example a pre-select filter, passes signals received in a predetermined band of frequencies to receiver modules 258 and 259. For example, in a UWB network environment filter 261 may be configured to pass frequencies occurring in one or more pre-defined band groups to the receiver modules. A first receiver module 258 comprises a low noise amplifier 262, a synchronizing module 263, signal processing module 264 and processing module 265, for example as described with respect to FIG. 6. Accordingly, receiving module 258 enables the network device to receive communications occurring on channel k. A second receiving module 259 comprises similar devices and modules, where primed elements have substantially similar functions to be on primed elements of module 258. Accordingly, receiving module 259 enables the network device to receive communications occurring on channel n. As described herein, by sequentially changing which channel the second receiving module 259 is monitoring, the network device is able to monitor neighboring channels for interference sources or further network devices. In these embodiments, power saving may be implemented by deactivating receiving module 259, for example if a scan of neighboring channels indicated that there were no sources of adjacent channel interference present.

Figure 8:
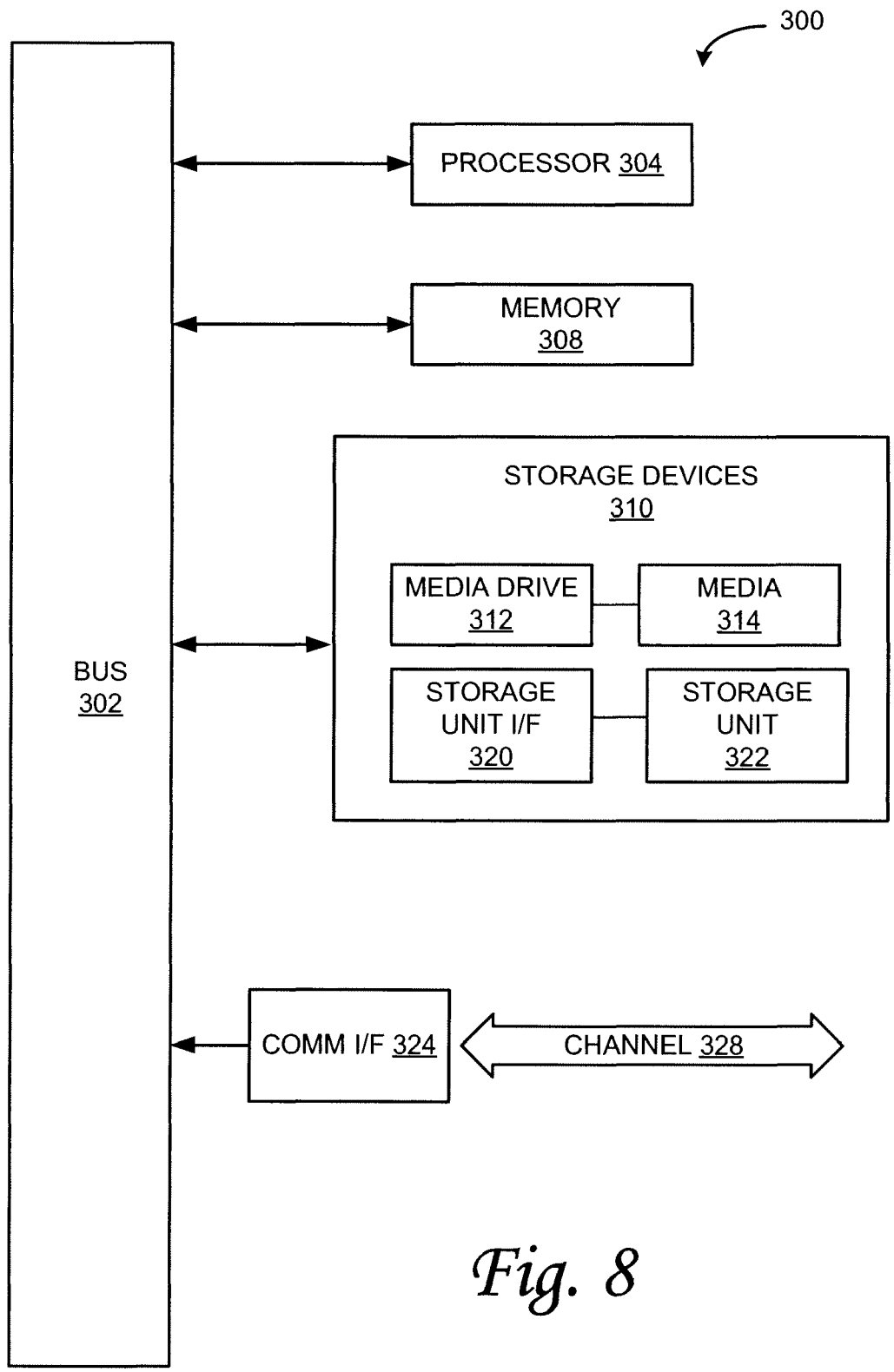
FIG. 8 illustrates an example computing module with which various aspects of the embodiments of the invention may be implemented.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 8. Various embodiments are described in terms of this example-computing module 300. After reading this description, it will become apparent to a person skilled in the relevant art how to implement the invention using other computing modules or architectures.

Referring now to FIG. 8, computing module 300 may represent, for example, computing or processing capabilities found within desktop, laptop and notebook computers; handheld computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 300 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 300 might include, for example, one or more processors, controllers, control modules, or other processing devices, such as a processor 304. Processor 304 might be implemented using a general-purpose or special-purpose processing engine such as, for example, a microprocessor, controller, or other control logic. In the illustrated example, processor 304 is connected to a bus 302, although any communication medium can be used to facilitate interaction with other components of computing module 300 or to communicate externally.

Computing module 300 might also include one or more memory modules, simply referred to herein as main memory 308. For example, preferably random access memory (RAM) or other dynamic memory, might be used for storing information and instructions to be executed by processor 304. Main memory 308 might also be used for storing temporary variables or other intermediate information during execution of instructions to be executed by processor 304. Computing module 300 might likewise include a read only memory ("ROM") or other static storage device coupled to bus 302 for storing static information and instructions for processor 304.

The computing module 300 might also include one or more various forms of information storage mechanism 310, which might include, for example, a media drive 312 and a storage unit interface 320. The media drive 312 might include a drive or other mechanism to support fixed or removable storage media 314. For example, a hard disk drive, a floppy disk drive, a magnetic tape drive, an optical disk drive, a CD or DVD drive (R or RW), or other removable or fixed media drive might be provided. Accordingly, storage media 314 might include, for example, a hard disk, a floppy disk, magnetic tape, cartridge, optical disk, a CD or DVD, or other fixed or removable medium that is read by, written to or accessed by media drive 312. As these examples illustrate, the storage media 314 can include a computer usable storage medium having stored therein computer software or data.

In alternative embodiments, information storage mechanism 310 might include other similar instrumentalities for allowing computer programs or other instructions or data to be loaded into computing module 300. Such instrumentalities might include, for example, a fixed or removable storage unit 322 and an interface 320. Examples of such storage units 322 and interfaces 320 can include a program cartridge and cartridge interface, a removable memory (for example, a flash memory or other removable memory module) and memory slot, a PCMCIA slot and card, and other fixed or removable storage units 322 and interfaces 320 that allow software and data to be transferred from the storage unit 322 to computing module 300.

Computing module 300 might also include a communications interface 324. Communications interface 324 might be used to allow software and data to be transferred between computing module 300 and external devices. Examples of communications interface 324 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 324 might typically be carried on signals, which can be electronic, electromagnetic (which includes optical) or other signals capable of being exchanged by a given communications interface 324. These signals might be provided to communications interface 324 via a channel 328. This channel 328 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 308, storage unit 320, media 314, and signals on channel 328. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 300 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for network communication, comprising:
a first network device wirelessly communicating with a second network device using a first channel and simultaneously scanning a range of further channels for wireless communications between further network devices, the wireless communications causing interference on the first channel;
if wireless communications between further network devices are detected on a second channel of the range of further channels, the first network device communicating with the second network device using the second channel according to an access protocol signal transmitted on the second channel by at least one of the further network devices;
detecting a service or a further network device on the second channel; and
utilizing the service or communicating with the further network device according to a media access protocol.

2. The method of claim 1, further comprising implementing receiver diversity if wireless communications are not detected on the further channels.

3. The method of claim 1, wherein the first channel and the further channels comprise time frequency coded channels.

4. The method of claim 3, wherein the time frequency coded channels occur on the same band group.

5. The method of claim 1, wherein the step of scanning is performed by a receiver module and the receiver module is deactivated if wireless communications are not detected on the further channels.

6. An apparatus for network communication and signal detection, comprising:
a receiver module configured to receive data from a network device on a first physical layer channel; and
a second receiver module configured to simultaneously scan a range of further physical layer channels for further wireless network communications, the further wireless network communications causing interference on the first physical layer channel; wherein
the apparatus is configured to communicate with the network device using a second channel according to an access protocol signal transmitted on the second channel if further wireless network communications are detected on the second channel;
the second receive module is further configured to detect a service or a further network device on the second channel; and
the apparatus is further configured to utilize the service or communicate with the further network device according to a media access protocol.

7. The apparatus of claim 6, further configured to implement receiver diversity using the second receiver module if further wireless network communications are not detected on the further channels.

8. The apparatus of claim 6, wherein the second receiving module is configured to be deactivated if further wireless network communications are not detected on the further channel.

9. The apparatus of claim 6, wherein the first channel and the further channels comprise time frequency coded channels.

10. The apparatus of claim 9, wherein the time frequency coded channels occur on the same band group.

11. Computer executable program code embodied on a computer readable medium configured to cause a first network device to perform the functions of:
the first network device wirelessly communicating with a second network device using a first channel and simultaneously scanning a range of further channels for wireless communications between further network devices, the wireless communications causing interference on the first channel;
if wireless communications between further network devices are detected on a second channel of the range of further channels, the first network device communicating with the second network device using the second channel according to an access protocol signal transmitted on the second channel by at least one of the further network devices: wherein:
the computer executable program code is further configured to cause the device to perform the function of:
detecting a service or a further network device on the second channel; and
utilizing the service or communicating with the further network device according to a media access protocol.

12. The computer executable program code of claim 11, further configured to cause the device to perform the function of implementing receiver diversity if wireless communications are not detected on the further channels.

13. The computer executable program code of claim 11, wherein the first channel and the further channels comprise time frequency coded channels occurring on the same band group.

14. The computer executable program code of claim 11, wherein the function of scanning is performed by a receiver module and the receiver module is deactivated if wireless communications are not detected on the further channels.

* * * * *